United States Patent
Inui et al.

(10) Patent No.: US 7,374,012 B2
(45) Date of Patent: May 20, 2008

(54) OPERATION CONTROL SYSTEM FOR SMALL-SIZED VEHICLE

(75) Inventors: Akira Inui, Iwata (JP); Kazuaki Iwami, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 169 days.

(21) Appl. No.: 10/975,600

(22) Filed: Oct. 28, 2004

(65) Prior Publication Data

US 2005/0257993 A1 Nov. 24, 2005

Related U.S. Application Data

(60) Provisional application No. 60/573,415, filed on May 24, 2004.

(51) Int. Cl.
 *B62D 5/04* (2006.01)
 *B60K 17/34* (2006.01)
 *B60K 17/35* (2006.01)

(52) U.S. Cl. ............... 180/444; 180/197; 180/233; 180/249; 701/41

(58) Field of Classification Search .............. 180/197, 180/233, 248, 249, 443, 444, 446; 701/41–43, 701/69, 70
See application file for complete search history.

(56) References Cited

U.S. PATENT DOCUMENTS

| | | | | |
|---|---|---|---|---|
| 5,020,626 | A * | 6/1991 | Kodama | 180/233 |
| 6,223,852 | B1 * | 5/2001 | Mukai et al. | 180/446 |
| 6,816,765 | B2 * | 11/2004 | Yamamoto et al. | 701/41 |
| 6,865,468 | B2 * | 3/2005 | Lin et al. | 701/70 |

FOREIGN PATENT DOCUMENTS

JP 63116982 A * 5/1988

* cited by examiner

*Primary Examiner*—Lesley D. Morris
*Assistant Examiner*—Marc A Scharich
(74) *Attorney, Agent, or Firm*—Keating & Bennett, LLP

(57) ABSTRACT

An operation control system for a small-sized vehicle is capable of reducing an electric power consumption of a battery used for a power steering apparatus. The operation control system includes a main switch configured to turn on/off an engine, and a power switch function configured to turn on/off an electric motor-driven power steering apparatus supplying an assisting steering force to a steering shaft.

16 Claims, 5 Drawing Sheets

OPERATION CONTROL SYSTEM FOR SMALL-SIZED VEHICLE

Applicant(s) claim(s) benefit under 35 U.S.C. § 119(e) of U.S. provisional application No. 60/573,415 filed May 24, 2004.

BACKGROUND OF THE INVENTION

1. Field of the Invention

The present invention relates to, for example, a small-sized vehicle such as a saddle type three-wheel vehicle or four-wheel vehicle used for farming, an ATV (All Terrain Vehicle) for sportive traveling off road, a golf cart, and other small-sized vehicles. More specifically, the present invention relates to a small-sized vehicle having a power steering apparatus.

2. Description of the Related Art

Generally, a small-sized vehicle used for traveling off-road has the following structure. Front and rear wheels each having a balloon tire with low pressure and wide diameter are disposed at front and rear portions of a vehicle body frame, and an engine unit is mounted between the front and rear wheels. Further, a steering shaft is arranged between the left and right front wheels, and a wheel-type steering handle or a bar-type steering handle is attached to the upper end of the steering shaft. A small-sized vehicle of this kind can travel off-road at will by turning the steering handle from side to side.

In recent years, some users expect further operational improvements when maneuvering the small-sized vehicle so as to reduce a load on operating the steering handle.

Accordingly, an electric motor-driven power steering apparatus which is connected to a steering shaft to thereby supply the steering shaft with an assisting steering force from the electric motor has been suggested.

In the case of the electric motor-driven type, a relatively large battery capacity is required. In order to reduce the weight of a vehicle having the electric motor-driven power steering apparatus, electric power consumption is required to be reduced, such that the battery capacity can be reduced.

SUMMARY OF THE INVENTION

To overcome the problems described above, preferred embodiments of the present invention provide an operation control system for a small-sized vehicle that reduces electric power consumption when the vehicle includes a power steering apparatus.

Preferred embodiments of the present invention provide a main switch configured to turn on/off an engine, and a power switch function configured to turn on/off a power steering apparatus supplying an assisting steering force to a steering shaft.

In preferred embodiments of the present invention, since the power switch function is provided separately from the main switch for the engine, the power steering apparatus can be actuated only when it is needed. Therefore, the battery power consumption is reduced accordingly.

In one preferred embodiment of the present invention, the power switch function is configured to actuate the power steering apparatus when the vehicle is moving.

In this preferred embodiment, the power steering apparatus functions only when the assisting steering force is actually needed, such as when the vehicle is moving, and is effective to reduce the battery power consumption.

Further, in this preferred embodiment, the power steering apparatus functions even when the engine is turned off.

In another preferred embodiment of the present invention, the power switch function is configured to actuate the power steering apparatus when the engine is rotating.

In this preferred embodiment, the power steering apparatus functions when the engine is rotating, even if the vehicle is not moving. Therefore, it is easy to perform a stop-and-steer operation to operate a steering handle when the vehicle is stopped, for example, when putting the vehicle in a garage.

In another preferred embodiment of the present invention, the power switch function includes a mechanical switch configured to connect/disconnect a power supply line which supplies power from a battery to an electric motor of the power steering apparatus and a switch control unit configured to turn on the mechanical switch when a vehicle moving signal is input from a vehicle speed sensor.

In this preferred embodiment, the mechanical switch is turned on when the vehicle is moving, such that the structure is simple.

In another preferred embodiment of the present invention, the vehicle speed sensor includes a rotation sensor disposed on the downstream side of a clutch disposed at a middle portion of a drivetrain which transmits the rotation of a crankshaft to an axle, and the switch control unit turns on/off the mechanical switch based on a signal from the rotation sensor.

In this preferred embodiment, since the rotation sensor is disposed on the downstream side of the clutch of the drivetrain, movement of the vehicle is accurately detected.

In preferred embodiments of the present invention, a power steering apparatus supplying an assisting steering force to a steering shaft is provided, and an assisting steering force control unit configured to control the power steering apparatus such that the assisting steering force corresponds to a vehicle operating state is provided.

In preferred embodiments of the present invention, the assisting steering force is controlled corresponding to the vehicle operating conditions, such that steering according to the operating conditions is provided.

In another preferred embodiment of the present invention, the assisting steering force control unit controls the assisting steering force to be a different value depending upon whether it is two-wheel drive or four-wheel drive. For example, the assisting steering force for two-wheel drive operation is controlled to be equal to or less than the assisting steering force for four-wheel drive operation.

In this preferred embodiment, the assisting steering force is controlled to be a value corresponding to the two-wheel drive and the four-wheel drive, such that an appropriate assisting steering force is provided regardless of the traveling mode.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Hereinafter, preferred embodiments of the present invention will be described with reference to the attached drawings. Note that the indications of front, rear, left and right in the description of the preferred embodiments represent the front, rear, left, and right when viewed from an operator seated on a seat of the vehicle.

Figure 1:
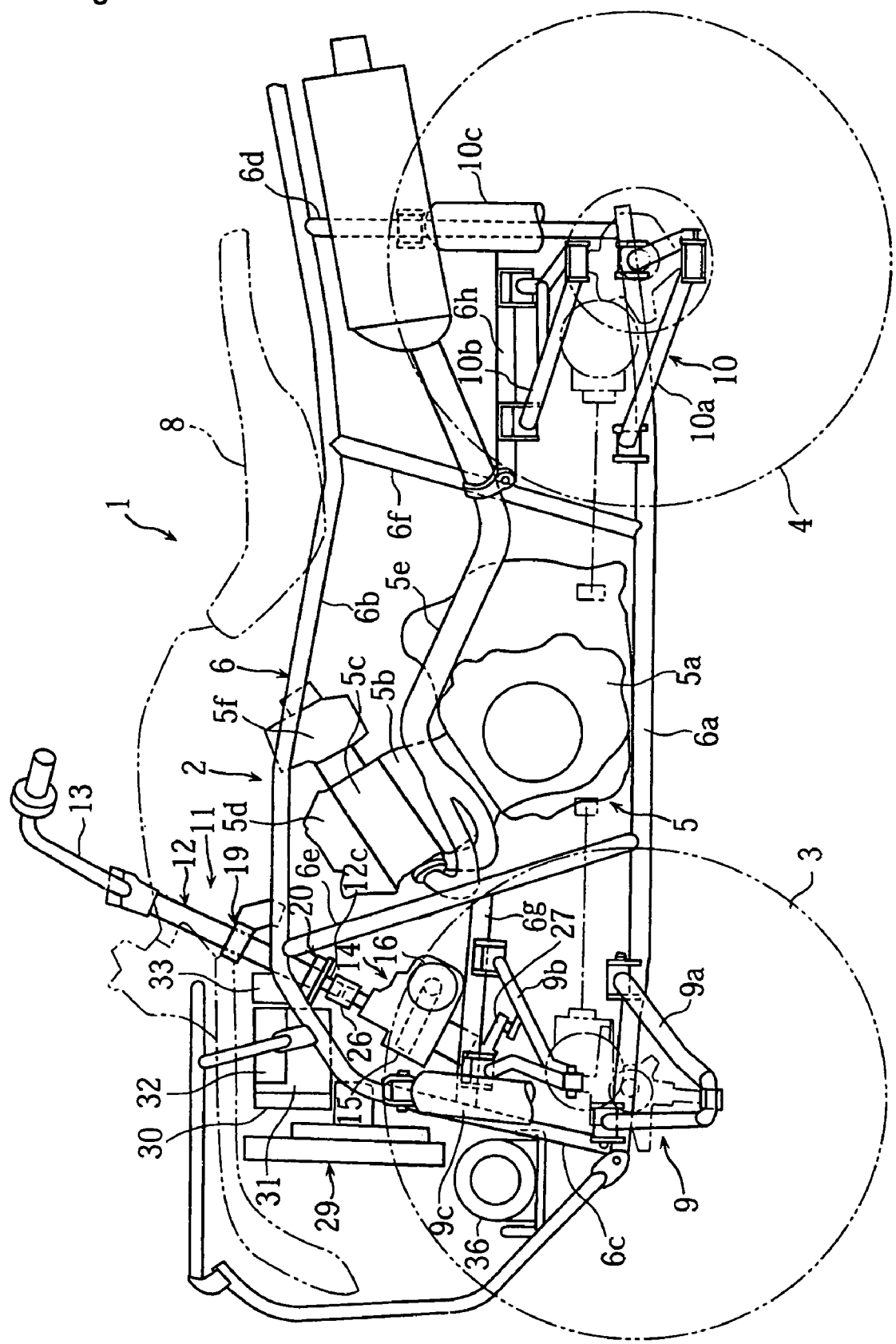
FIG. 1 is a left side view of a small-sized vehicle for traveling off road having an operation control system according to a first preferred embodiment of the present invention, in which some components are shown by solid lines, and some components are shown by chain-double dashed lines and dotted lines.
Figure 2:
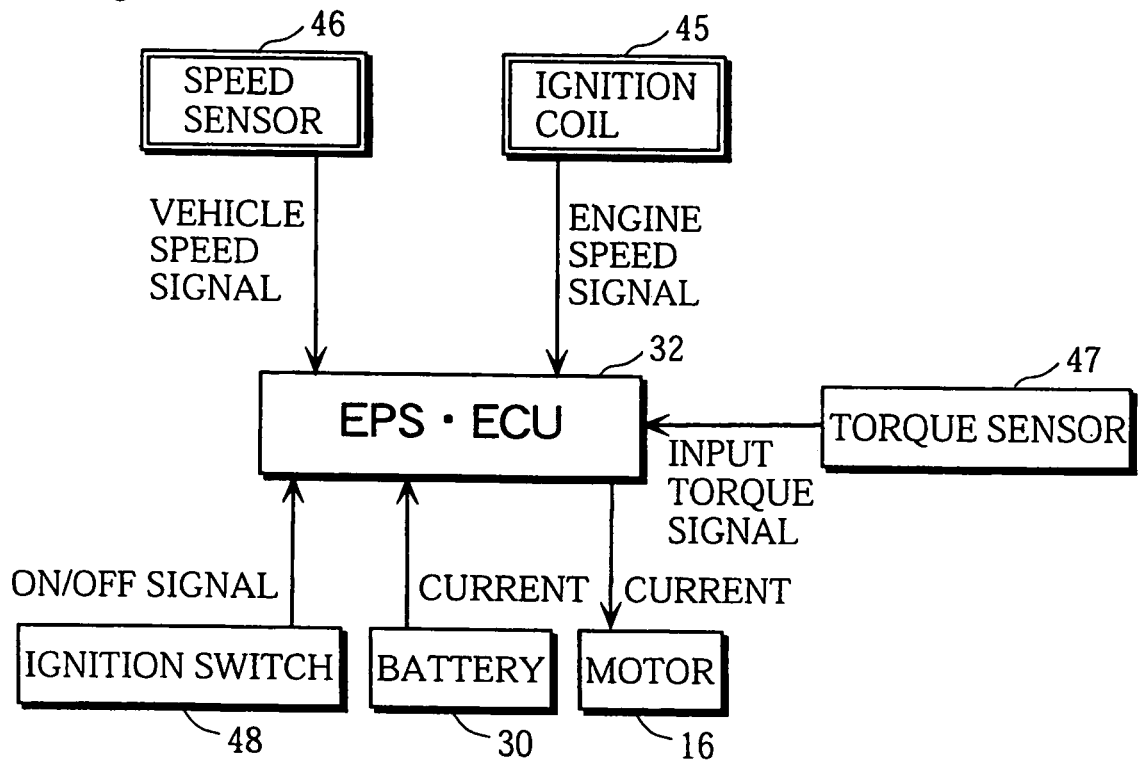
FIG. 2 is a block diagram of the operation control system for the small sized vehicle.
Figure 3:
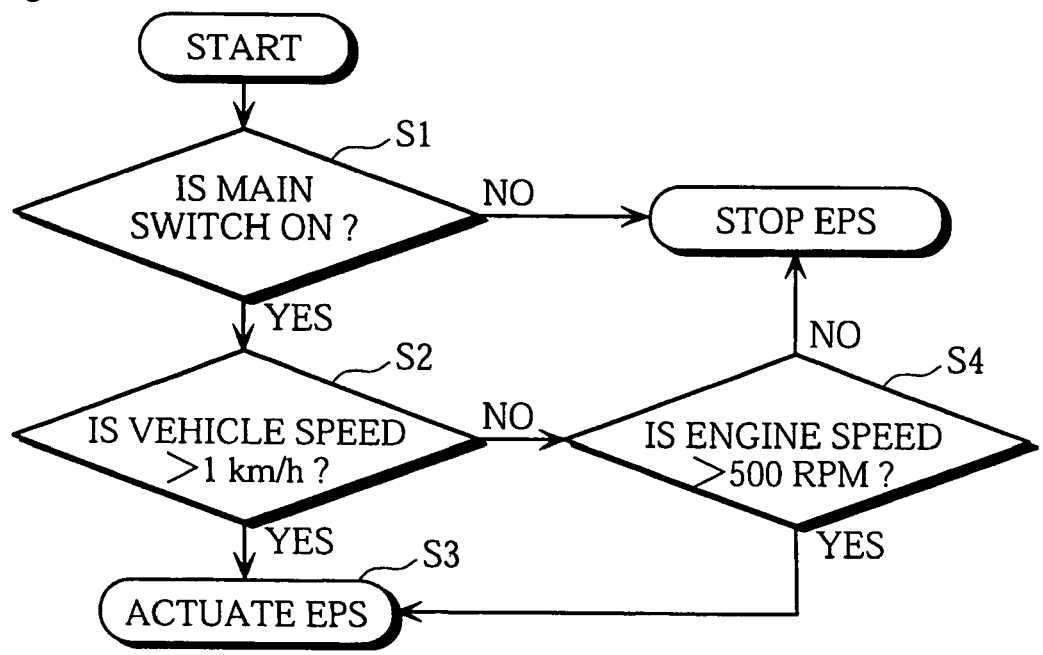
FIG. 3 is a flow chart describing an operation of the operation control system.

FIG. 1 to FIG. 3 are views for describing a first preferred embodiment of the present invention. In FIG. 1, "1" denotes a small-sized vehicle for traveling off road. This small-sized vehicle 1 includes a vehicle body frame 2, left and right front wheels 3, 3 disposed at left and right front portions of the vehicle body frame 2, left and right rear wheels 4, 4 disposed at left and right rear portions of the vehicle body frame 2, an engine unit 5 mounted on the vehicle body frame 2 between the front wheels 3 and the rear wheels 4, a steering system 11 disposed between the left and right front wheels 3, 3, a battery 30, an engine control unit 31, and a power steering control unit 32.

The vehicle body frame 2 is a double cradle type frame in which left and right side frames 6, 6 are connected to each other by a plurality of cross pipes. Each of the side frames 6 includes a lower pipe 6a arranged approximately at a height of the axes of the front and rear wheels 3, 4 and extending in the front to rear direction of the vehicle 1, an upper pipe 6b arranged approximately at a height of the lower end of a saddle type seat 8 and extending in the front to rear direction, a front-end vertical pipe 6c, a rear end vertical pipe 6d and intermediate vertical pipes 6e, 6f on front and rear sides which are coupled to the upper and lower pipes 6b, 6a, a horizontal pipe 6g coupling the front-end vertical pipe 6c to the intermediate vertical pipe 6e on the front side, and a horizontal pipe 6h coupling the intermediate vertical pipe 6f on the rear side to the rear-end vertical pipe 6d.

The engine unit 5 is mounted in a space surrounded by the lower and upper pipes 6a, 6b, and the intermediate vertical pipes 6e, 6f on the front and rear sides. In front of an engine case 5a having a built-in crankshaft of the engine unit 5 and a built-in transmission, a cylinder block 5b, a cylinder head 5c, and a head cover 5d are stacked and fastened. Further, an exhaust unit 5e is connected to the front wall of the cylinder head 5c, and a carburetor 5f is connected to the rear wall thereof.

In front of the steering system 11, a radiator 29 is disposed for cooling the cooling water of the engine unit 5 by moving air. Between the radiator 29 and the steering system 11, various on-vehicle components are provided, such as the above-mentioned battery 30, the engine control unit 31 for the engine 5, a power steering control unit 32 for a power steering apparatus which will be described later, a plurality of relays 33, and other components.

The left and right front wheels 3, 3 are supported in a vertically swingable and horizontally steerable manner by a double wishbone type front wheel suspension system 9 including a lower arm 9a, an upper arm 9b and a cushion unit 9c.

Further, the left and right rear wheels 4, 4 are supported in a vertically swingable manner by a double wishbone type rear wheel suspension system 10 including a lower arm 10a, an upper arm 10b and a cushion unit 10c.

The steering system 11 includes a steering shaft 12 arranged substantially at the center between the left and right front wheels 3, 3, a steering handle 13 attached to the upper end of the steering shaft 12, and an electric motor-driven power steering apparatus 14 connected to the lower end of the steering shaft 12.

The steering shaft 12 and the power steering apparatus 14 are coupled to each other in a substantially straight line by a serration type coupling pipe 26, and are arranged so as to be tilt rearward. Further, the steering shaft 12 is supported on the vehicle body frame 6 via an upper bearing 19 and a lower bearing 20.

The power steering apparatus 14 includes a deceleration mechanism 15 and an electric motor 16 integrally fixed to the deceleration mechanism 15. The electric motor 16 is disposed rearward of the steering shaft 12 and arranged to deviate leftward from the center line in the vehicle width direction. Further, an output shaft protruding downward from the deceleration mechanism 15 is coupled to the front wheel 3 via a pitman arm 27 and a tie rod.

As shown in FIG. 2, an engine speed signal from an ignition coil 45, a vehicle speed signal (vehicle movement signal) from a speed sensor (vehicle speed sensor) 46, an input torque signal corresponding to a steering force applied to the steering shaft 12 from a torque sensor 47, and an on/off signal from a main switch (ignition switch) 48 are input to the power steering control unit 32.

Here, the speed sensor 46 may be defined by a rotation sensor disposed on the downstream side of a clutch arranged at a middle portion of a drivetrain which transmits the rotation of a crankshaft to an axle.

Further, the power steering control unit 32 operates as a power switch function to turn on and off the operation of the power steering apparatus 14. Specifically, the power steering control unit 32 is configured to actuate the power steering apparatus 14 when the small-sized vehicle 1 is moving (traveling) and when the engine is rotating. Note that, in preferred embodiments of the present invention, the power steering control unit 32 may be configured to stop operation of the power steering apparatus 14 when the vehicle is not moving, even if the engine is rotating.

Control operation of the power steering control unit 32 will be described with reference to the flowchart in FIG. 3. When a main switch 48 is turned on (Step S1), the power steering control unit 32 determines whether the small-sized vehicle 1 is moving or not from the vehicle speed (Step S2), and when the vehicle speed exceeds 1 km/h, the power steering control unit 32 determines that the vehicle is moving and then actuates the power steering apparatus 14 (Step S3). On the other hand, when the power steering control unit 32 determines that the vehicle is moving in Step S2, whether the engine is rotating or not is determined from the engine speed (Step S4), and when the engine speed exceeds approximately 500 rpm, for example, the power steering apparatus 14 is actuated.

When the power steering apparatus 14 is actuated, the power steering control unit 32 calculates a current value for the electric motor 16 required to obtain an assisting steering force corresponding to the input torque signal from the torque sensor 47. Then, the calculated current value is supplied from the battery 30 to the electric motor 16, and the assisting steering force is outputted.

As described above, in the system of this preferred embodiment, the power steering apparatus 14 is actuated only when it is needed according to the operation of the vehicle. Therefore, the battery power is preserved.

Further, in this preferred embodiment, the power steering apparatus 14 operates when the vehicle is moving, even if the engine is stopped.

Further, in this preferred embodiment, the power steering apparatus 14 operates when the engine is rotating, even if the vehicle is not moving. Therefore, it is easy to perform a stop-and-steer operation to operate a steering handle in a stopped state, for example, when putting the vehicle in a garage.

Figure 4:
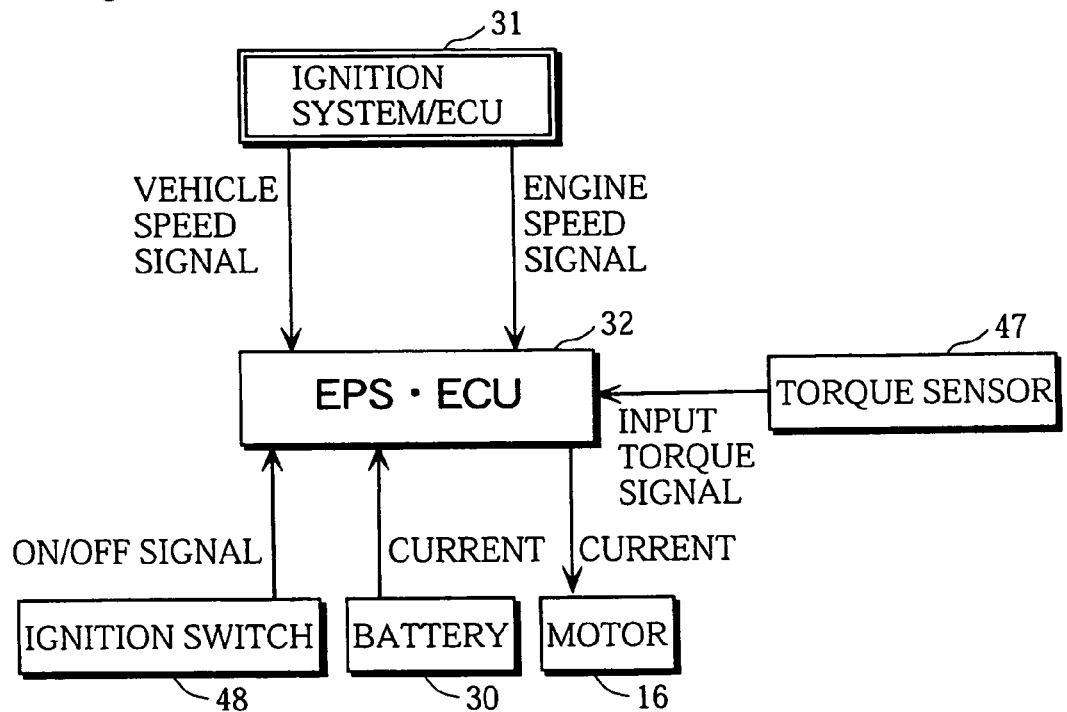
FIG. 4 is a block diagram showing a modified example of the operation control system shown in FIG. 2.

As described in the example in FIG. 2, the engine speed signal from the ignition coil 45 and the vehicle speed signal from the speed sensor 46 are input to the power steering control unit 32. However, the engine speed signal and the vehicle speed signal may be configured to be input from the engine control unit 31 as shown in FIG. 4.

Further, as described in the example in FIG. 2 the power steering control unit 32 performs the above-described power switch function. However, the power switch function may also be provided using a mechanical switch configured to connect/disconnect a power supply line which supplies power from the battery 30 to the electric motor 16 of the power steering apparatus 14, and a switch control unit configured to turn on the mechanical switch when the vehicle speed signal is input from the vehicle speed sensor 46. Note that, in this case, the function of the switch control unit is performed by the power steering control unit 32.

Figure 5:
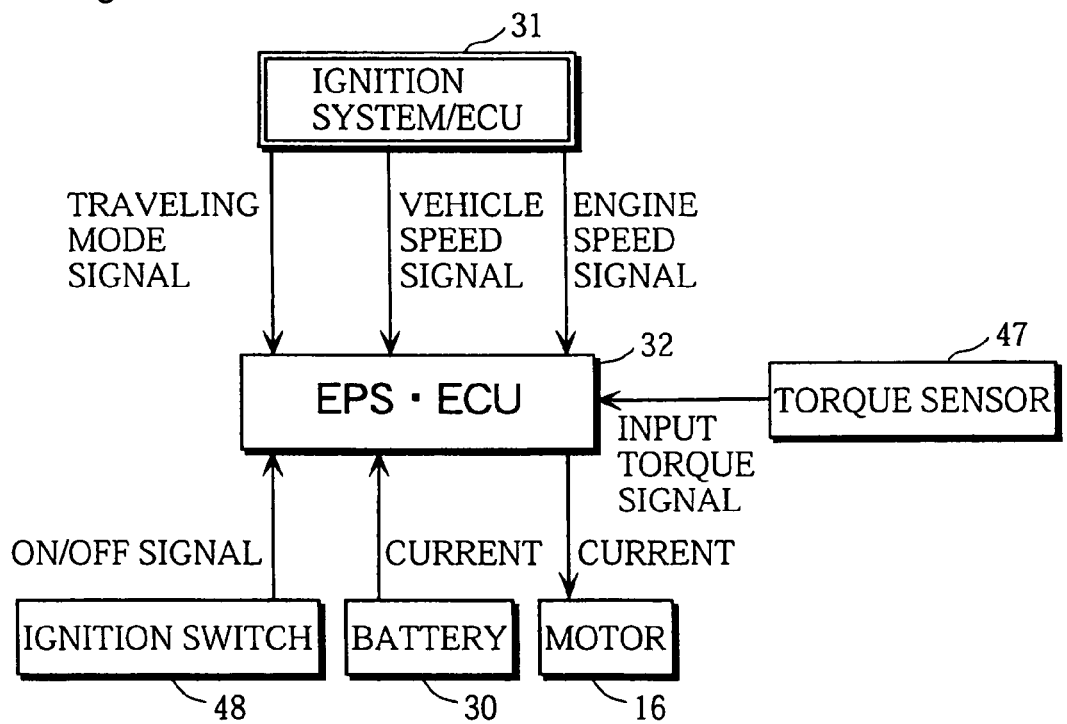
FIG. 5 is a block diagram of an operation control system for a small-sized vehicle according to a second preferred embodiment of the present invention.
Figure 6:
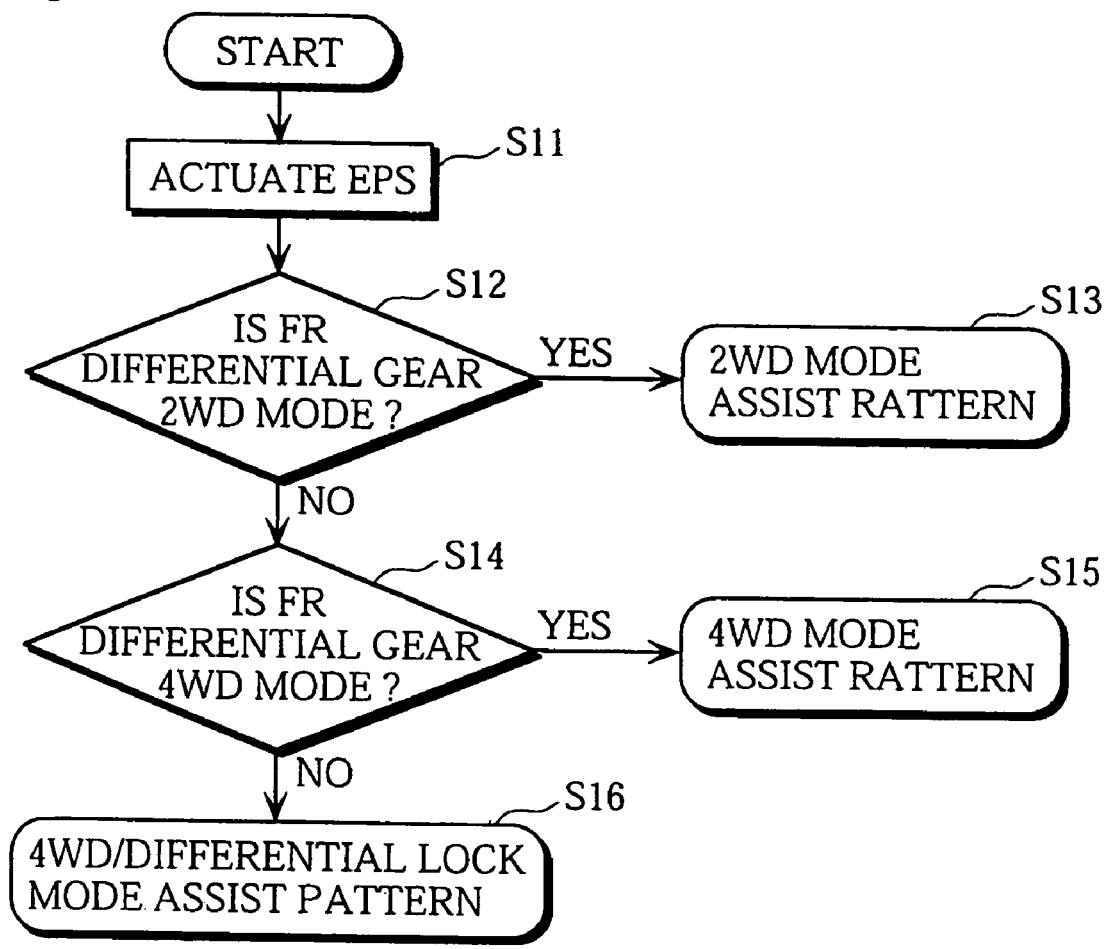
FIG. 6 is a flowchart describing the operation of the second preferred embodiment.

FIG. 5 and FIG. 6 illustrate a second preferred embodiment of the present invention, in which the same reference numerals as those in FIG. 2 denote identical or equivalent elements. In FIG. 5, in addition to the engine speed signal and the vehicle speed signal, a traveling mode signal is input from the engine control unit 31 to the power steering control unit 32. This traveling mode signal is a signal indicating which traveling mode the vehicle is in: two-wheel drive mode, four-wheel drive mode, or four-wheel drive differential lock mode.

In FIG. 6 which shows a flowchart of the power steering control unit 32, when the power steering apparatus 14 begins operation (Step S11), the traveling mode is determined, and an assisting steering force corresponding to the traveling mode is output. Specifically, when the traveling mode is the two-wheel drive mode, an assisting steering force corresponding to the two-wheel drive mode is selected (Steps S12, S13), when the traveling mode is the four-wheel drive mode, an assisting steering force corresponding to the four-wheel drive mode is selected (Steps S14, S15), and when the traveling mode is in neither of the two-wheel drive mode and the four-wheel drive mode, an assisting steering force corresponding to the four-wheel drive differential lock mode is selected (Step S16).

As described above, the assisting steering force corresponding to the traveling mode is selected depending upon which traveling mode the vehicle is in: the two-wheel drive mode, the four-wheel drive mode, or the four-wheel drive differential lock mode. Therefore, an appropriate assisting steering force corresponding to the traveling mode is provided, such that the steering is appropriately performed in any traveling mode.

Figure 7:
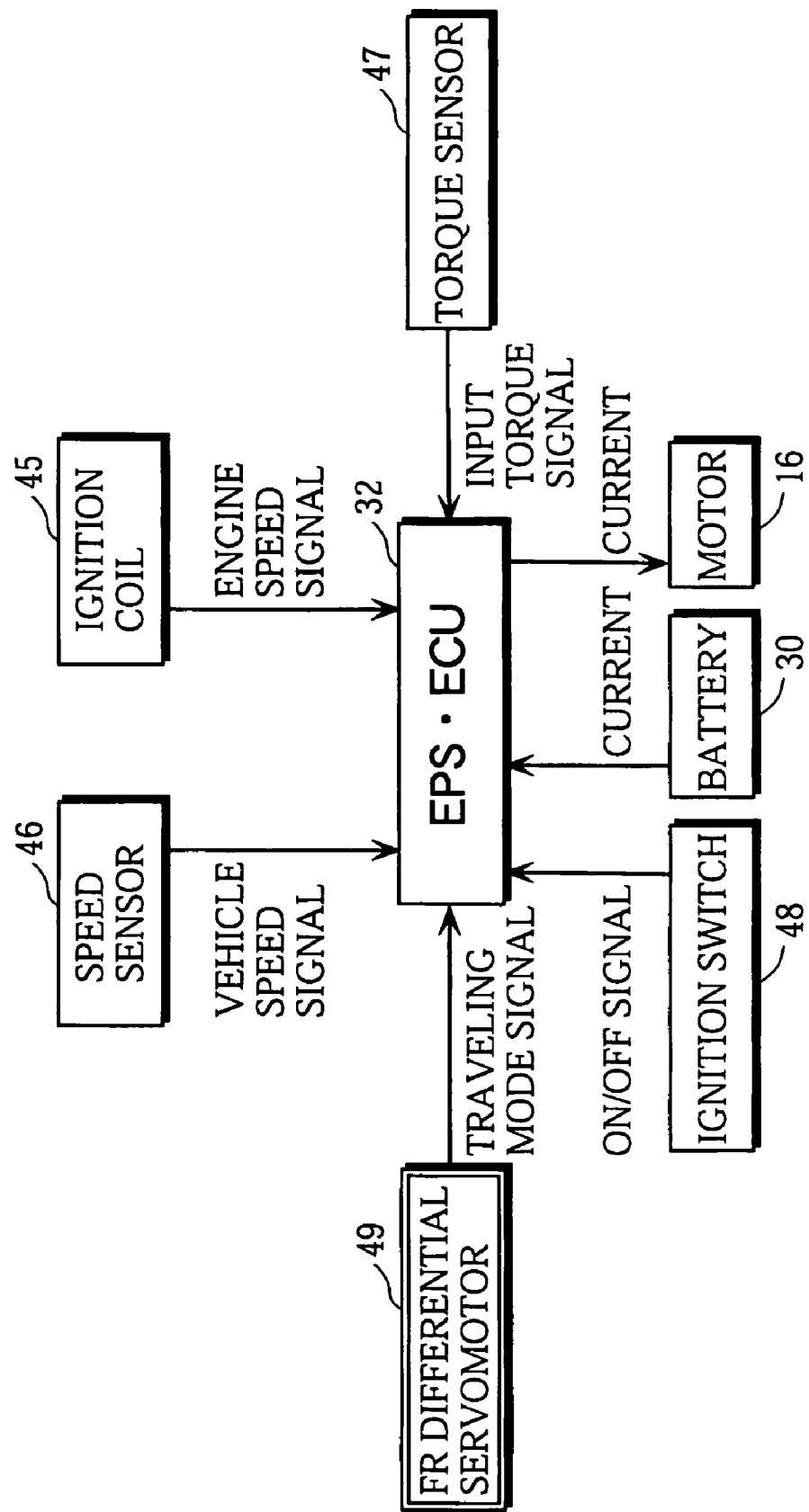
FIG. 7 is a block diagram showing a modified example of the operation control system shown in FIG. 5.

Incidentally, in the example shown in FIG. 5, the traveling mode signal is obtained from the engine control unit 31. However, the traveling mode signal may be obtained from a traveling mode detecting sensor 49 provided on a servomotor of the differential gear for the front and rear wheels as shown in FIG. 7.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. An operation control system for a vehicle, comprising:
   a power steering apparatus arranged to supply an assisting steering force to a steering shaft; and
   an assisting steering force control unit configured to control said power steering apparatus such that the assisting steering force is adjusted to correspond to different vehicle operating states; wherein
   said assisting steering force control unit controls the assisting steering force to be a different value depending on whether a vehicle operating state is two-wheel drive or four-wheel drive differential lock.

2. The operation control system for the vehicle according to claim 1, further comprising:
   a main switch configured to turn on/off an engine; and
   a power switch function configured to turn on/off the power steering apparatus.

3. The operation control system for the vehicle according to claim 2, wherein said power switch function is configured to actuate the power steering apparatus when the vehicle is moving.

4. The operation control system for the vehicle according to claim 3, wherein said power switch function is configured to actuate the power steering apparatus when the engine is rotating.

5. The operation control system for the vehicle according to claim 2, wherein said power switch function includes a mechanical switch configured to connect/disconnect a power supply line which supplies power from a battery to an electric motor of the power steering apparatus, and a switch control unit configured to turn on said mechanical switch when a vehicle traveling signal is input from a vehicle speed sensor.

6. The operation control system for the vehicle according to claim 1, wherein said assisting steering force control unit further controls the assisting steering force to be a different value depending on whether the vehicle operating state is four-wheel drive.

7. An operation control system for a vehicle, comprising:
   a main switch configured to turn on/off an engine;
   a power steering apparatus arranged to supply an assisting steering force to a steering shaft;
   a power switch function configured to turn on/off the power steering apparatus; and
   an assisting steering force control unit configured to control said power steering apparatus such that the assisting steering force is adjusted to correspond to different vehicle operating states; wherein said assisting steering force control unit controls the assisting steering force to be a different value depending on whether a vehicle operating state is two-wheel drive or four-wheel drive;

said power switch function includes a mechanical switch configured to connect/disconnect a power supply line which supplies power from a battery to an electric motor of the power steering apparatus, and a switch control unit configured to turn on said mechanical switch when a vehicle traveling signal is input from a vehicle speed sensor; and the vehicle speed sensor includes a rotation sensor disposed on a downstream side of a clutch interposed at a middle portion of a drivetrain which transmits a rotation of a crankshaft to an axle, and said switch control unit turns on/off said mechanical switch in response to a signal from the rotation sensor.

8. The operation control system for the vehicle according to claim 7, wherein said assisting steering force control unit sets the assisting steering force when the vehicle operating state is two-wheel drive to be less than the assisting steering force when the vehicle operating state is four-wheel drive.

9. An operation control system for a vehicle, comprising:
a power steering apparatus supplying an assisting steering force to a steering shaft; and
an assisting steering force control unit configured to control said power steering apparatus such that the assisting steering force is adjusted to correspond to different vehicle operating states; wherein
said assisting steering force control unit controls the assisting steering force to be a different value depending on whether a vehicle operating state is four-wheel drive or four-wheel drive differential lock.

10. The operation control system for the vehicle according to claim 9, further comprising:
a main switch configured to turn on/off an engine; and
a power switch function configured to turn on/off the power steering apparatus.

11. The operation control system for the vehicle according to claim 10, wherein said power switch function is configured to actuate the power steering apparatus when the vehicle is moving.

12. The operation control system for the vehicle according to claim 11, wherein said power switch function is configured to actuate the power steering apparatus when the engine is rotating.

13. The operation control system for the vehicle according to claim 9, wherein said assisting steering force control unit further controls the assisting steering force to be a different value depending on whether the vehicle operating state is two-wheel drive.

14. The operation control system for the vehicle according to claim 10, wherein said power switch function includes a mechanical switch configured to connect/disconnect a power supply line which supplies power from a battery to an electric motor of the power steering apparatus, and a switch control unit configured to turn on said mechanical switch when a vehicle traveling signal is input from a vehicle speed sensor.

15. An operation control system for a vehicle, comprising:
a power steering apparatus arranged to supply an assisting steering force to a steering shaft;
an assisting steering force control unit configured to control said power steering apparatus such that the assisting steering force is adjusted to correspond to different vehicle operating states;
a main switch configured to turn on/off an engine; and
a power switch function configured to turn on/off the power steering apparatus; wherein
said assisting steering force control unit controls the assisting steering force to be a different value depending on whether a vehicle operating state is two-wheel drive or four-wheel drive;
said power switch function includes a mechanical switch configured to connect/disconnect a power supply line which supplies power from a battery to an electric motor of the power steering apparatus, and a switch control unit configured to turn on said mechanical switch when a vehicle traveling signal is input from a vehicle speed sensor; and
the vehicle speed sensor includes a rotation sensor disposed on a downstream side of a clutch interposed at a middle portion of a drivetrain which transmits a rotation of a crankshaft to an axle, and said switch control unit turns on/off said mechanical switch in response to a signal from the rotation sensor.

16. The operation control system for the vehicle according to claim 15, wherein said assisting steering force control unit sets the assisting steering force when the vehicle operating state is two-wheel drive to be less than the assisting steering force when the vehicle operating state is four-wheel drive.

* * * * *